No. 765,401. PATENTED JULY 19, 1904.
T. SMITH.
COMBINED CULTIVATING PLOW AND CHOPPER.
APPLICATION FILED AUG. 1, 1903.
NO MODEL. 3 SHEETS—SHEET 3.
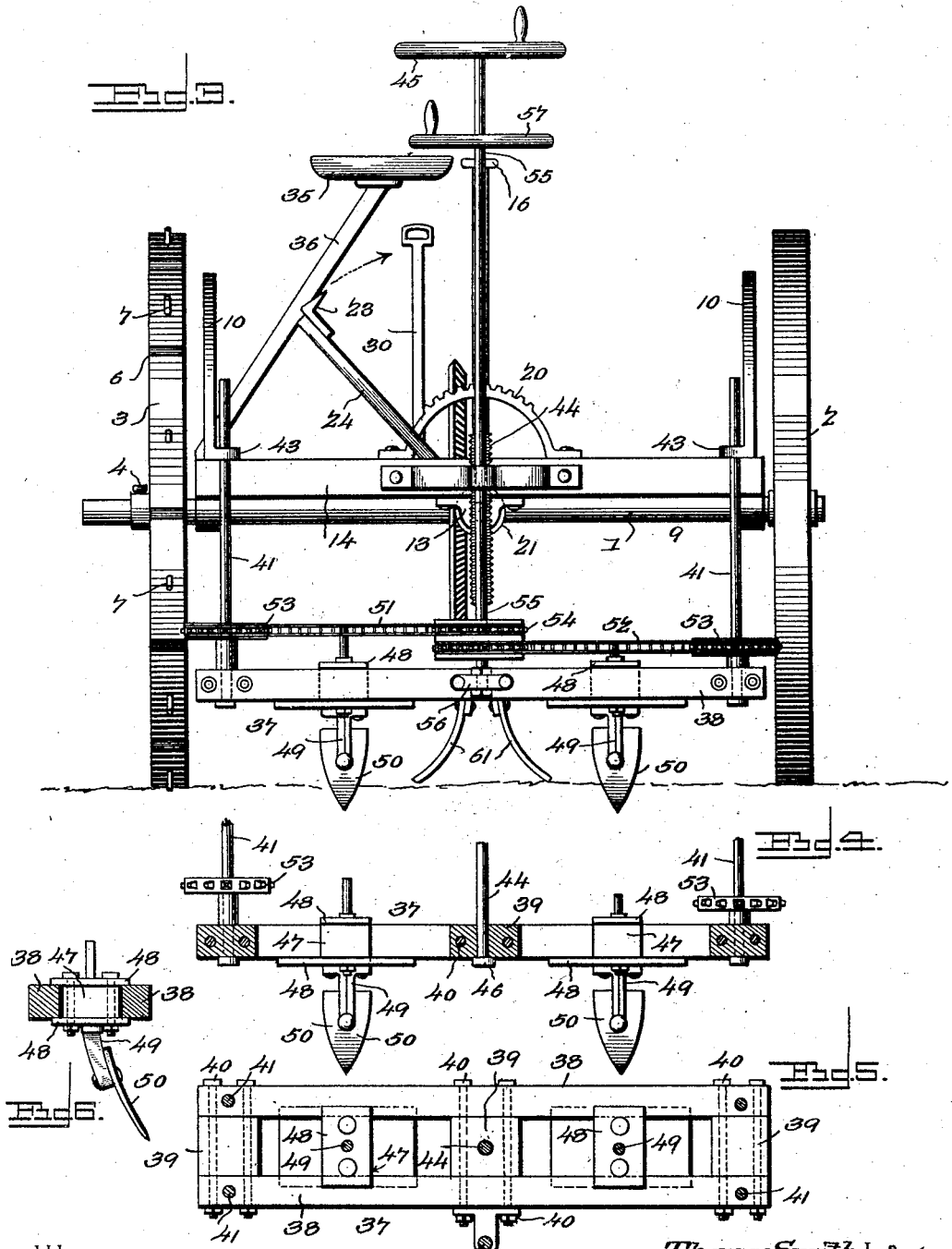

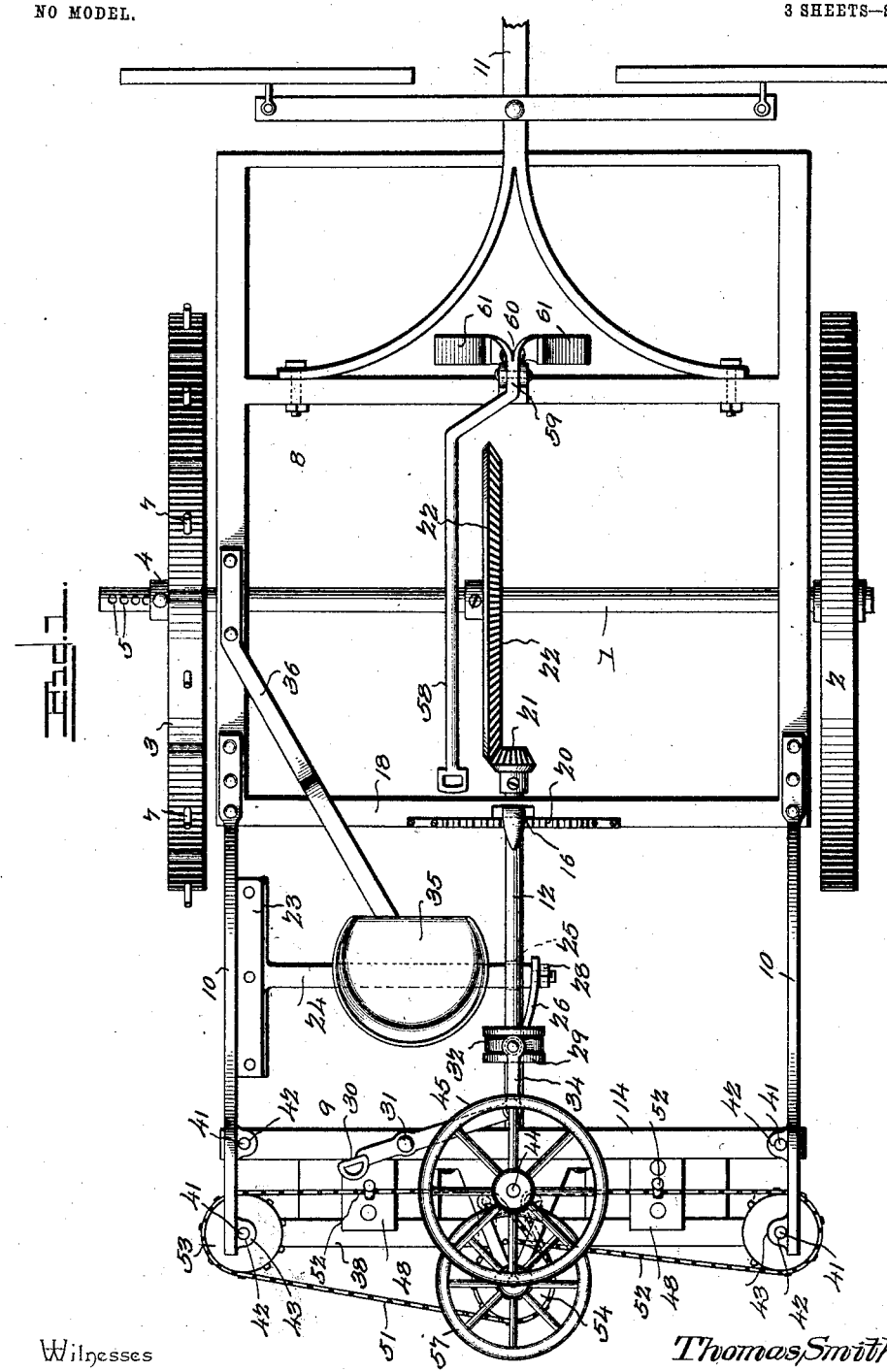

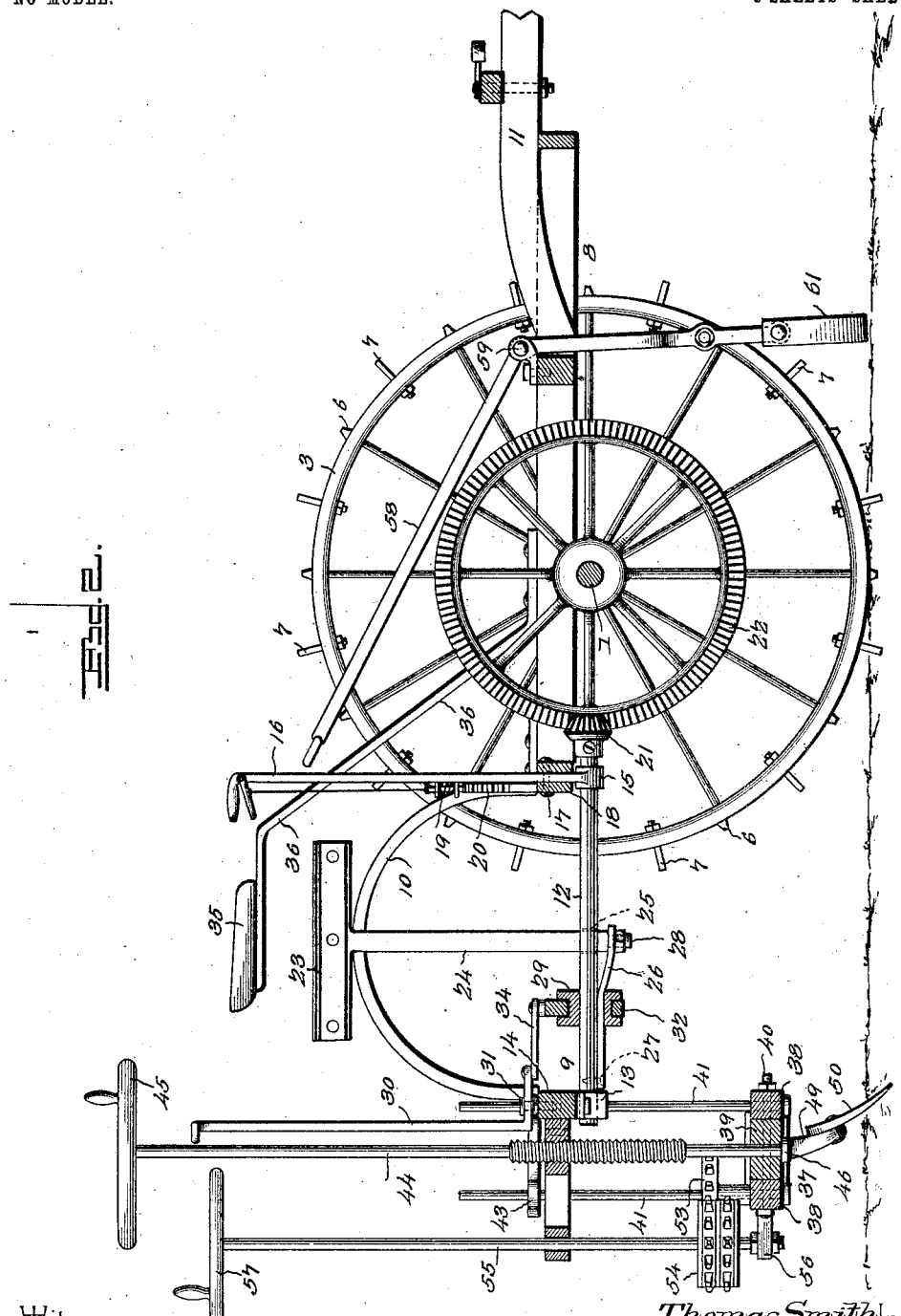

No. 765,401.

Patented July 19, 1904.

UNITED STATES PATENT OFFICE.

THOMAS SMITH, OF DONALDS, SOUTH CAROLINA.

COMBINED CULTIVATING-PLOW AND CHOPPER.

SPECIFICATION forming part of Letters Patent No. 765,401, dated July 19, 1904.

Application filed August 1, 1903. Serial No. 167,939. (No model.)

*To all whom it may concern:*

Be it known that I, THOMAS SMITH, a citizen of the United States, residing at Donalds, in the county of Abbeville and State of South Carolina, have invented a new and useful Combined Cultivating-Plow and Chopper, of which the following is a specification.

My invention is an improved cultivating-plow and chopper, the object of my invention being to provide a combined machine which is adapted to be used in cultivating growing plants—such as corn, cotton, and the like—and which may be used either for hoeing or chopping the growing plants, plowing them, or plowing and hoeing them at once, hence adapting the machine for all the purposes of cultivating growing crops.

To these ends my invention consists in the peculiar construction and combination of devices hereinafter fully set forth, and particularly pointed out in the claims.

In the accompanying drawings, Figure 1 is a top plan view of a combined cultivating-plow and hoeing or chopping machine embodying my improvements. Fig. 2 is a vertical longitudinal central sectional view of the same. Fig. 3 is a rear elevation of the same. Fig. 4 is a detail central sectional view of the plow-frame and its connections. Fig. 5 is a top plan view of the same. Fig. 6 is a detail sectional view of the same on a plane at right angles to Fig. 4.

The axle-shaft 1 is provided at one end with a supporting-wheel 2, which is loose thereon, and at the opposite end with the traction-wheel 3, which is adjustable laterally thereon and secured thereto by a bolt 4 and a series of adjusting-openings 5, said bolt and said openings serving to secure said wheel to said axle-shaft at any desired adjustment on the shaft and in such manner that rotary motion of said traction-wheel is imparted to said axle-shaft. Said traction-wheel, in addition to the usual peripheral traction-teeth 6, is provided with traction spur-bolts 7 for engaging the loose soil in a cultivated field and insuring rotation of the traction-wheel.

The machine-frame comprises the front section 8, supported on the axle-shaft, and the rear section 9, which is connected to said front section by the arch bars or yokes 10, which are of the form here shown and bolted to said front and rear sections, as indicated. The usual tongue or draft-pole 11 is provided for the front section of the machine-frame. A hoeing or chopping shaft 12 is disposed longitudinally and journaled at its rear end in a bearing 13, located centrally under the front transverse bar 14 of the rear frame-section, and the front portion of said shaft is journaled and supported in a bearing 15, formed in the lower end of a shifting lever 16, which lever is fulcrumed on a bolt 17 in the center of the rear transverse beam 18 of the front frame-section, and said lever has the usual spring-detent 19 to engage the usual rack-segment 20 on said beam 18, whereby said lever may be secured at any required position. On the front end of the shaft 12 is keyed or otherwise firmly secured a beveled pinion 21, which engages a beveled gear-wheel 22, that is fast on the axle-shaft.

A hoe or chopper 23 of suitable size, form, and construction has its arm 24 disposed at right angles to the shaft 12 and to the line of draft, said arm extending through a transverse opening 25 in said shaft. A retaining and adjusting spring 26 of suitable length and construction has one end secured to the shaft 12, as at 27, and its free end, which tends to move from said shaft, connected to the inner end of the hoe or chopper-arm, as at 28. An adjusting-sleeve 29 is mounted on the shaft 12 and adapted to move thereon, and said sleeve engages the said spring 26, the latter passing through a suitable opening in said sleeve, as shown in Fig. 2, and the said sleeve is connected to a hand-lever 30, which has its fulcrum 31 on the transverse bar 14 of the rear frame-section by a yoke or strap 32, which is disposed in an annular groove in said sleeve, and a link 34, which is pivotally connected to said yoke or strap and to the said lever 30, as shown.

It will be understood from the foregoing that when the machine is in operation, with its supporting and traction wheel on opposite sides of a row of growing plants and the shaft 12 shifted so as to cause its pinion 21 to engage the gear-wheel 22, rotary motion from the axle-shaft will be transmitted to said shaft 12 and the chopper or hoe, the latter being caused to revolve transversely over the row of plants and to chop or hoe between the plants in the row, or, if said plants are continuous, or practically continuous, in the row and are too close together, the chopper will serve to chop out intervening plants and leave suitable "stands" at suitable regular distances apart, the same being predetermined by the width of the chopping-hoe and by the relative proportions of the gears 21 22. By means of the shifting mechanism hereinbefore described for throwing the rotary chopper into or out of gear with the driving or axle shaft the said chopper may be so adjusted at the beginning of each row as to operate between the stands of plants that have been previously thinned or chopped, as will be readily understood. By moving the adjusting-sleeve 29 forward or back on the shaft 12 by means of the lever 30 and the connections hereinbefore described said sleeve may be caused to move the free end of the spring toward or from said shaft 12, and hence the chopper or hoe at the outer end of the arm 24 may be adjusted toward or from said shaft 12, and thereby caused to operate at the required depth in the soil. When it is not designed to use the chopping mechanism hereinbefore described, the same may be thrown out of gear by the lever 16. A seat 35 for the driver is supported in a convenient position between the levers 16 and 30 on a seat-bar 36, which has its lower end bolted to one side of the frame 8, as shown.

A rectangular plow-frame 37 is disposed transversely under the rear frame 9 and comprises the front and rear parallel bars 38 and the end and intermediate connecting-blocks 39, secured between said parallel bars by bolts 40, as shown. From the four corners of the plow-frame rise vertical guide-rods 41, which pass through and are maintained in suitable openings 42 in the horizontally and rearwardly extended arms 43 of the arch-bars 10. Said guide-rods while maintaining the plow-frame in position under the rear frame 9 permit of the vertical adjustment of said plow-frame. A screw-shaft 44 engages a threaded opening in or a nut attached to the center of the rear frame 9. The upper end of said screw-shaft is provided with a hand wheel or crank 45, whereby it may be turned, and the lower end of said shaft is swiveled to the center block of the plow-frame, as at 46. The function of the said screw-shaft is to raise and lower the plow-frame and to maintain the same in any desired vertical adjustment, as will be understood.

The parallel bars 38 of the plow-frame constitute the guide ways and supports for laterally-adjustable plow-blocks 47, which fit between said bars 38 and are secured thereto against vertical displacement and permitted to slide thereon by plates 48, which are bolted to the upper and lower sides of said plow-blocks and engage the upper and lower sides of said plow-bars 38, as shown in Figs. 4, 5, and 6. Plow-stocks 49 are secured to said plow-blocks 47 in any suitable manner and serve for the attachment of cultivating-shovels or bull-tongues 50, and the upper extended ends of said plow-stocks are adapted to be secured to endless adjusting-chains 51, as at 52. Said endless chains connect sprocket-wheels 53, which are mounted on two of the guide-rods 41, with sprocket-wheels 54, which are fixed on a shaft 55, that has its bearings in the rear frame 9 and in a bracket 56, bolted to the rear side of the plow-frame. Said shaft 55 has a crank or hand-wheel 57, by means of which it may be rotated, and it will be readily understood that the endless chain will be operated by the rotation of said shaft 55 and caused to adjust the plows in the plow-frame either toward or from each other, as may be required, and hence the said plows may be so adjusted as to operate at any desired distance from the rows of plants.

A hand-lever 58 is fulcrumed on the frame 8 in a line with the center thereof, as at 59. The lower end of the said lever is forked or bifurcated, as at 60, and provided with cutters 61, which are adapted to operate in advance of the chopper and to clear away grass, weeds, and other obstructions from the rows.

Having thus described my invention, I claim—

1. The combination, with a revoluble shaft, of a radially-adjustable arm, a spring secured to said shaft and connected to said arm, and an adjusting device for said spring.

2. In a device of the class described, a revoluble shaft, a chopper-carrying arm radially adjustable with relation to said shaft, and spring supporting means for said arm.

3. In a device of the class described, a revoluble shaft having a transverse slot, a chopper-carrying arm movable in said slot and radially adjustable with relation to the shaft, and spring supporting means for said arm.

4. In a device of the class described, a revoluble shaft, a chopper-carrying arm connected with and radially disposed with relation to said shaft, spring supporting means for said arm, and means for adjusting the tension of said spring.

5. In a device of the class described, the combination of a revoluble shaft, a chopper-carrying arm carried by and radially adjustable with relation to said shaft, a flat spring secured to the shaft and connected at its free end to the arm, and means for compressing said spring in the direction of the shaft to regulate the outward tension thereof.

6. The combination, with a revoluble shaft and a chopping-arm carried thereby and radially adjustable with relation to said shaft, of a spring secured to said shaft, and connected at its free end to said arm, an adjusting-sleeve on said shaft and engaging said spring, for the purpose set forth, and a lever to operate said adjusting-sleeve, substantially as described.

7. In a machine of the class described, a frame comprising front and rear sections and arch-bars connecting said sections together, an axle-shaft journaled in the front section, traction-wheels upon said axle, a longitudinally-disposed shaft having a bearing in the rear section and a movable bearing in the front section, gearing connecting said shaft with the axle-shaft, and a spring-supported chopping element connected adjustably with said shaft.

In testimony that I claim the foregoing as my own I have hereto affixed my signature in the presence of two witnesses.

THOMAS SMITH.

Witnesses:
J. ROSS COLHOUN,
C. WARRENER.